Nov. 21, 1950     S. D. HOPPER     2,530,613
SIDE DELIVERY TRUCK TANK

Filed May 28, 1945     2 Sheets-Sheet 1

INVENTOR.
S. D. Hopper
BY
*Webster & Webster*
ATTYS

Nov. 21, 1950

S. D. HOPPER 2,530,613

SIDE DELIVERY TRUCK TANK

Filed May 28, 1945

INVENTOR.
S. D. Hopper
BY
ATTYS

Patented Nov. 21, 1950

2,530,613

UNITED STATES PATENT OFFICE 2,530,613

SIDE-DELIVERY TRUCK TANK

Shirley D. Hopper, Manteca, Calif.

Application May 28, 1945, Serial No. 596,132

4 Claims. (Cl. 298—18)

This invention relates to open-topped side delivery vehicle bodies, particularly the type known as truck tanks, in which grapes etc. are conveyed from the vineyard to the winery.

The principal objects of my invention are to provide a tank body of this character which is pivoted on an axis extending lengthwise of the supporting chassis for upward tilting movement to one side, and so formed and mounted that a minimum of power only is required to tilt the tank toward a dumping position from its normal load carrying position and so that the load becomes balanced after a relatively small amount of lifting movement has been imparted to the tank so that from that point on the power requirements are relieved; and one which dumps its entire load very rapidly. At the same time the tank has a good load carrying capacity which is retained within the lateral limits of a standard truck bed.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
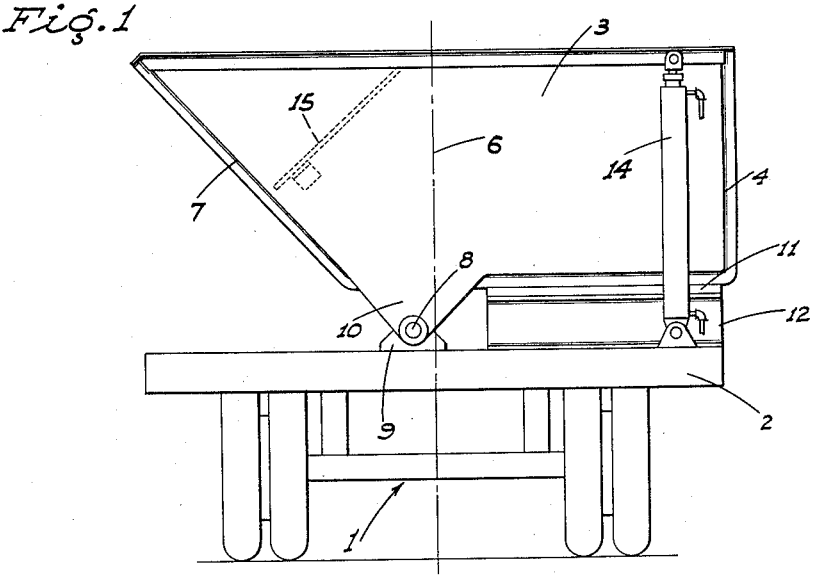
Figure 1 is an end elevation of my improved truck tank in its load transporting position.

Referring now more particularly to the characters of reference on the drawings, the numeral 1 denotes a supporting chassis generally, which may be of the full or semi-trailer type, and which includes a rectangular bed frame 2 of any desired construction; the chassis itself forming no part of my invention.

The tank body 3, which is of sheet metal and water-tight construction, extends lengthwise of the bed and includes a vertical sidewall 4 disposed adjacent the plane of one side of the bed, a flat bottom 5 some distance above the bed extending from the wall 4 to a point some distance beyond the vertical longitudinal central plane 6 of the chassis, and an opposite sidewall 7 extending downwardly at an angle of approximately 45° from a point at the top of the body adjacent the vertical plane of the corresponding side of the bed to a junction with the adjacent side edge of the bottom 5.

Figure 2:
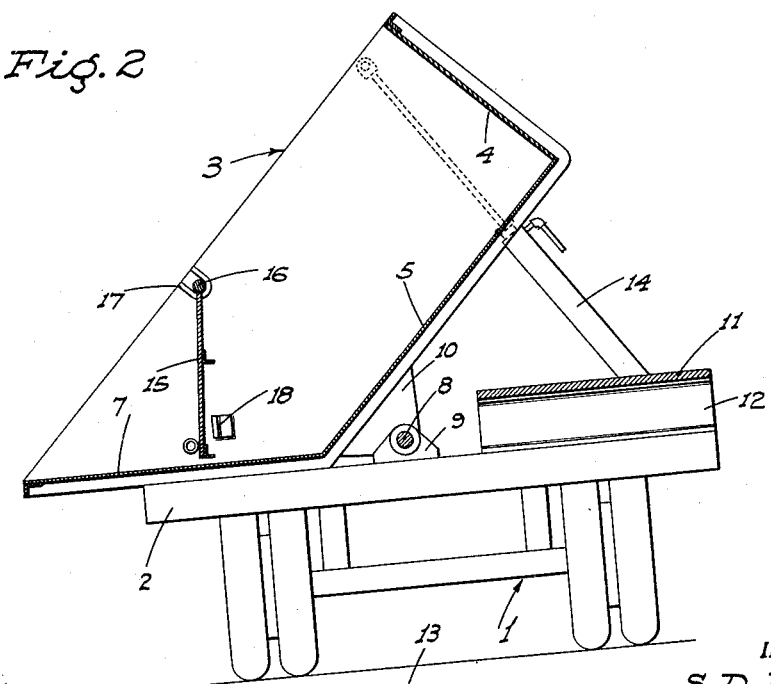
Figure 2 is a transverse section showing the tank in its full dumping position.
Figure 3:
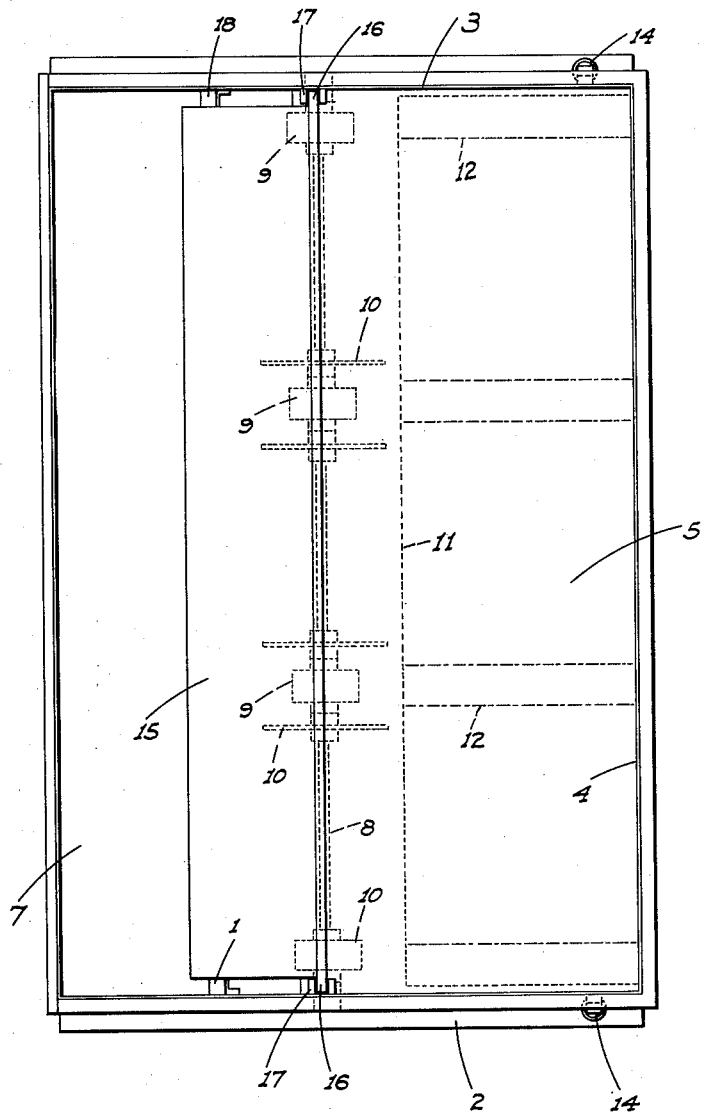
Figure 3 is a top plan view of the tank in its transporting position.

A longitudinally extending shaft 8 is mounted in bearings 9 on the bed in somewhat laterally offset relation to the central plane 6 on the side thereof farthest from the side wall 4, and consequently is disposed relative to the bottom 5 between said plane 6 and the juncture of sidewalls 7 with said bottom. This shaft is as close to the bed as practicable and engages bearing brackets 10 depending from the bottom 5 at intervals. The sloping wall 7 is so disposed relative to this pivotal shaft that when the body is tilted to a full dumping position said wall will lie adjacent and substantially parallel to the bed, as shown in Fig. 2.

To attain the best results as to ease of operation and balancing of the load the pivotal shaft 8 is disposed below the bottom 5 a distance approximately one-quarter the height of the body 3, while the lateral offset of the pivot relative to the center of total width of the body at the top is approximately 1/24 of such width.

When the tank is in a load carrying position so that the bottom 5 is horizontal it is supported between the pivotal shaft and the wall 4 by a platform 11 mounted on transverse girders 12 on the corresponding side of the bed, so that the tank may be of relatively light construction without likelihood of bulging. Also, of course the tank can only tilt upwardly from its supported side toward the sloping or discharge lip side.

The above form and mounting of the tank provides good carrying capacity retained within the limits of the sides of the bed, as is desirable. While the greatest percentage of the load, when the body is completely filled, is obviously between the central plane 6 and the sidewall 4, upward tilting of the tank from this heavy side through a comparatively small arc (between 20° and 30°) will cause the load to be balanced so that further tilting of the body takes but little power. This initial arc of tilting movement before the load balance is attained may be decreased considerably if the vehicle, at its discharge station, runs onto a ramp 13 having a transverse slope upwardly toward the heavy side of the body, as shown in Fig. 2. The tank may be tilted to a dumping position by double acting hydraulic or air cylinder units 14 connected to the ends of the tank adjacent the wall 4 and to the bed 2 on the corresponding side.

A more nearly initial balancing of the load will obviously be had if the weight of the load in the sloping wall portion adjacent the top is increased.

This may be done by the use of a removable partition or gate 15 extending lengthwise in the tank and provided at the top with end trunnions 16 turnably and removably seated in saddles 17 on the end walls of the tank at the top adjacent the vertical plane of the shaft 8. This gate is normally held in the tank at an opposite angle to the sloping wall 7 which it closely approaches by stop brackets 18 under the gate, which do not prevent the same from swinging in the direction of the discharge movement of the load 6 when the tank is tilted to a dumping position. By means of this partition or gate it will be seen that a triangular load retaining area is provided in the tank which is separated from the main load carrying area and in which a load may be placed which does not press on and hence mix with the load below. This additional load therefore aids in effecting a counterweight to the corresponding side of the tank adjacent the top, reducing the power necessary to tilt the tank and the distance which it must be tilted before a balance is obtained. If the use of the gate is not desired at any time it can of course be left out.

From the foregoing description it will be readily seen that there has been produced such a device as substantially fulfills the objects of the invention as set forth herein.

While this specification sets forth in detail the present and preferred construction of the device, still in practice such deviations from such detail may be restorted to as do not form a departure from the spirit of the invention, as defined by the appended claims.

Having thus described the invention, what is claimed as new and useful and upon which Letters Patent is desired is:

1. A side delivery vehicle tank-body comprising a normally substantially vertical sidewall, an opposite sidewall sloping downwardly from the top toward the first wall and a normally substantially horizontal bottom joining the sidewalls at their lower end; the vehicle including a bed, and means pivoting the body on the bed for lateral tilting movement and positioned so that the greatest portion of the load carrying area of the body lies between the pivot means and the vertical wall, and separating means in the body to cooperate with the sloping sidewall to divide the body into a load retaining area downwardly into the body from the top thereof and adjacent the sloping side separate from the remaining area therein.

2. A structure as in claim 1 in which said means includes a removable partition.

3. A structure as in claim 1 in which said means includes a partition extending lengthwise in the body, and means mounting the partition for swinging movement in the direction of discharging movement of the load behind when the body is tilted to dispose the sloping wall in a substantially horizontal position.

4. The combination with a wheel supported substantially rectangular bed frame, of a tank body comprising a substantially horizontal bottom of less width than the bed frame, a substantially vertical side upstanding from one edge of the bottom and lying in substantially the same vertical plane as one side of the bed frame, and a sloping side on the body extending at an upward slope from the other edge of the bottom and in a direction away from the vertical side and terminating at its outer edge in substantially the same vertical plane as the opposite side of the bed frame; a pivot shaft extending longitudinally along and secured to the bed frame adjacent the longitudinal center line thereof, brackets depending from the bottom of the tank, the lower ends of said brackets being journaled on said shaft, a hydraulic lift unit pivoted at one end to the bed frame adjacent that side on which the vertical side of the tank is located, the upper end of said unit being pivotally connected with the top edge of the tank, and a partition plate within the tank extending from a point substantially midway of the sloping side and at substantially right angles thereto to form a load retaining area in which the vertical center of weight of any load therein will be substantially against the mid portion of said sloping side, the partition being pivoted for swinging movement toward the outer edge of the sloping side when the tank is tilted relative to the bed frame.

SHIRLEY D. HOPPER.

REFERENCES CITED

The following references are of record in the file of this patent:

UNITED STATES PATENTS

| Number | Name | Date |
| --- | --- | --- |
| 405,777 | Hill | June 25, 1889 |
| 409,394 | Duff | Aug. 20, 1889 |
| 513,447 | Trapp | Jan. 23, 1894 |
| 796,763 | Schmitt | Aug. 8, 1905 |
| 1,952,986 | Horton | Mar. 27, 1934 |
| 2,047,051 | Armington et al. | July 7, 1936 |